United States Patent
Mori

(10) Patent No.: US 7,148,978 B1
(45) Date of Patent: Dec. 12, 2006

(54) PRINTING PROCESS, PRINTING PROCESSOR, AND RECORDING MEDIUM IN WHICH PRINTER DRIVER PROGRAM IS RECORDED

(75) Inventor: Hiromi Mori, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/352,335

(22) Filed: Jul. 13, 1999

(30) Foreign Application Priority Data

Jul. 14, 1998 (JP) .................................. 10-198795

(51) Int. Cl.
*G06F 13/00* (2006.01)
*G06K 15/02* (2006.01)

(52) U.S. Cl. ..................................... 358/1.15; 358/1.13
(58) Field of Classification Search ................ 358/1.15, 358/1.13, 1.16, 1.14, 1.18, 1.17; 345/581, 345/594, 531, 538
See application file for complete search history.

(56) References Cited

U.S. PATENT DOCUMENTS 5,121,477 A * 6/1992 Koopmans et al. .......... 345/762
6,039,426 A * 3/2000 Dobbs ........................... 347/19
6,278,528 B1 * 8/2001 Ohtsuka et al. ............. 358/1.15
6,295,136 B1 * 9/2001 Ono et al. .................. 358/1.15
6,574,002 B1 * 6/2003 Paczewitz ................... 358/1.13

FOREIGN PATENT DOCUMENTS

| JP | A-2-155027 | 6/1990 |
|----|------------|--------|
| JP | A-04-146180 | 5/1992 |
| JP | A-7-187491 | 7/1995 |
| JP | A-07-200194 | 8/1995 |
| JP | A-9-12214 | 1/1997 |
| JP | A-9-146731 | 6/1997 |
| JP | A-09-244966 | 9/1997 |

* cited by examiner

*Primary Examiner*—Douglas Q. Tran
(74) *Attorney, Agent, or Firm*—Oliff & Berridge, PLC

(57) ABSTRACT

Part of the set data which would conventionally be managed by a printer driver is stored in a special setting storage region from and into which both the printer driver and a print setting program cause data to be read out and written, respectively. For printing, the printer driver causes the print setting program to start in accordance with a setting. The print setting program causes set data to be read in from the special setting storage region and displayed. If a data is entered, the program causes the set data in the region to be updated. Therefore, for printing, it is possible to check the set data without doing a troublesome operation.

9 Claims, 11 Drawing Sheets

PRINTING PROCESS, PRINTING PROCESSOR, AND RECORDING MEDIUM IN WHICH PRINTER DRIVER PROGRAM IS RECORDED

BACKGROUND OF THE INVENTION

1. Field of the Invention

The present invention relates to a printing process for controlling a printer by outputting control data, and for causing the printer to carry out printing by outputting print data. It also relates to a printing processor for executing such a process. It further relates to a recording medium in which a printer driver program for causing a computer to execute such a process is stored.

2. Description of Related Art

When each of many personal and other computers (or their CPUs) in wide use in recent years executes a printing process in accordance with an application (program) read into its main memory, the operator is supposed or needs to specify the output destination with an identifier such as "LPT1:". A storage region under the control of the system stores in it the relation between each output destination, which can be specified with an identifier, and the printer assigned to the destination. When the application requests output to the destination specified by the user, the computer originates, in accordance with the printer driver (program) associated with the printer and read into the main memory, print data necessary for printing by the printer assigned to the destination and control data necessary for controlling the printer. The computer outputs the originated print and control data to the printer.

As shown in FIG. 8 of the accompanying drawings, the printer driver 90 includes a setting module 91 which can manage the data set for the associated printer and a printing module 92 which can originate print data and control data. The data set for the printer are stored in a print setting storage region 94, from and into which the driver 90 reads out data and writes data, respectively. When the operator changes the settings for the printer, the computer executes, mainly in accordance with the setting module 91, a process for reading out from the storage region 94 the data set for the printer and a process for writing into this region the set data changed by the operator. When the application requests output to the destination, the computer executes, mainly in accordance with the setting module 91, a process for reading out from the storage region 94 the data set for the printer, and mainly in accordance with the printing module 92 with reference to the set data, a process for originating print data necessary for printing by the printer, a process for originating control data necessary for controlling the printer, a process for outputting the print and control data to the printer, and other processes.

In general, for printing in accordance with an application which runs on an OS for interactive operation through a GUI, the computer displays on a display a window or screen (dialog box) 100 as shown in FIG. 9 of the drawings. Then, the computer stands by until the operator does a predetermined operation.

In order to immediately start printing, the operator can, by doing a very simple operation, instruct the printer driver to start a printing process. This operation involves either clicking the "OK" button 101 on the window 100 with the mouse or using the keyboard.

Before printing, however, if the operator wants to check or change the settings for the printer, he or she needs to do a fairly troublesome operation.

More specifically, the printer includes a number of discharge trays. It can be determined which of the trays prints should be discharged to. The operator cannot on the window 100 confirm which tray his or her print will be discharged to. As a matter of course, the operator cannot on the window 100 change over to another tray. In order to check the discharge destination, the operator needs to click at least the "Properties" button 102 on the window 100. If the operator clicks this button 102, the printer driver causes the computer to display a window 110 as shown in FIG. 10 of the drawings. This window 110 includes tags 111–114 for various groups of items. Because only the items associated with the tag 111 are shown initially on the window 110, the operator can still neither check nor change the tray. Therefore, the operator needs to click the tag 114 so that the computer displays a window 120 as shown in FIG. 11 of the drawings. If the operator does not know that this tag 114 needs clicking, however, he or she may at worst click the tags 112, 113 and 114 in that order.

Thus, it is troublesome to check and/or change the settings for the printer. In particular, if it is necessary to frequently change the settings, it is a heavy burden for the operator to check and/or change them.

SUMMARY OF THE INVENTION

Accordingly, one object of the present invention is to provide a printing process, printing processor and a printer which make it easier to check the current settings for a printer than conventionally when a printing process is carried out. Another object is to provide a printing process, printing processor and a printer which make a user free to determine whether to make it possible to check the settings. Still another object is to provide a printing process, printing processor and a printer which make it possible to immediately change the checked settings. Still another object is to provide a recording medium including a program which makes it easier to check the current settings for a printer than conventionally when a printing process is carried out.

According to a first aspect of the invention, a printing process is provided for a printer. The process comprises the steps of:

displaying at least part of set data for the printer on a display (the displaying step);

then, originating at least one of print data necessary for printing by the printer and control data necessary for controlling the printer (the data originating step), the control data being originated on the basis of set data previously stored in a storage region; and outputting at least one of the originated print data and the set data to the printer (the outputting step).

Thus, prior to the step of originating print data necessary for printing by the printer and/or, originating, on the basis of set data stored in the storage region, control data necessary for controlling the printer, displaying step of display at least part of the set data on the display is executed. This makes it possible to check at least part of the set data on the display before the originating step. Therefore, it is not troublesome to check at least part of the set data on the display.

The displaying step may be executed in accordance with a print setting program. An instruction for starting the program may be stored in the set data.

At least part of the set data may be provided to determine whether to execute the displaying step, or for another purpose. Specifically, a dedicated item may be provided for alternative settings. If one of the settings is selected, the displaying step may be executed. If the other setting is selected, the displaying step may not be executed. Another item may be provided originally to determine whether an optional part is fitted. With reference made to this item, the displaying step may be executed if the optional part is fitted, and this step may not be executed if the part is not fitted.

The printing process may further comprise a step to update at least part of the set data displayed on the display. The displaying step may include executing a data updating process for updating at least part of the set data in accordance with the operation at an input unit. Therefore, if it is necessary to change at least part of the set data after checking at least part of the set data on the display, it is possible to immediately update part of the set data. This is not troublesome as compared with a case where it is necessary to update set data by following another procedure once after checking at least part of the set data on a display.

The printer may have a plurality of discharge positions, and can discharge paper to the discharge position specified in advance. The set data may include the discharge positions. The control data originated in the data originating step may include the data which represent the discharge positions. In the outputting step, the control data may be output prior to the print data to the printer. In the displaying step, the specified discharge position may be displayed on the display. In this case, because the currently selected discharge position is displayed on the display, the discharge position can be checked on the display before the control data representing the discharge position is sent to the printer in the originating step and/or the outputting step. This makes it easy or simple to check the currently selected discharge position on the display. It is therefore possible to prevent paper from being discharged to a wrong discharge position by mistake. In the displaying step, the specified discharge position may be updated by being changed into another discharge position. In the displaying step, all of the discharge positions may be displayed on the display.

According to a second aspect of the invention, another printing process is provided for a printer. This process includes outputting, to the printer, print data for printing by the printer and control data for controlling the printer. The control data is derived from set data stored in advance in a memory. The process also includes displaying at least part of the set data on a display before outputting the print data and the control data to the printer.

According to a third aspect of the invention, a printing processor is provided for a printer. The processor comprises:
  a memory;
  print data origination means for originating print data necessary for printing by the printer;
  control data origination means for originating, on the basis of set data stored in advance in the memory, control data necessary for controlling the printer;
  output means for outputting the originated print data and/or the set data to the printer;
  a display; and
  control means for controlling the display so as to display at least part of the set data on the display before print data or control data is originated.

This printing processor is suitable to perform the process according to the first aspect. The memory of the printing processor may include a plurality of storage regions. The printer may include a plurality of dischargers. The control data may be data for designating any of the dischargers. The print data origination means and the control data origination means may be a printer driver printing module.

According to a fourth aspect of the invention, a printer is provided which includes the foregoing printing processor.

In order to execute the foregoing printing processes on a computer system for more general purposes, that is to say, in order for a computer system to function as the foregoing printing processor, a printer driver may run on the system to execute the processes. In general, such printer drivers are distributed in the form of recording media.

According to a fifth aspect of the invention, a recording medium is provided in which a printer driver program is recorded. The program causes a computer to execute the steps of:
  displaying at least part of set data for a printer on a display;
  originating at least one of print data necessary for printing by the printer and control data necessary for controlling the printer, the control data being originated on the basis of set data stored in advance in a storage region; and
  outputting the at least one of the originated print data and the set data to the printer.

The recording medium may be a magnetic tape, a flexible disk or another recording medium for magnetic reading, or an optical disk, an optical magnetic disk or another recording medium for optical reading, or any other known recording medium from which the recorded contents can be read out in a computer system.

Such a recording medium makes it possible to execute the foregoing printing processes on a general purpose computer system by installing a printer driver program in the system. Prior to the originating step of originating print data necessary for printing by the printer and/or originating, on the basis of set data stored in the storage region, control data necessary for controlling the printer, the displaying step to display at least part of the set data on the display is executed. This makes it possible to check at least part of the set data on the display before the data originating step. Therefore, it is possible for a general purpose computer system to function equivalently as the foregoing printing processor, and it is not troublesome to check at least part of the set data on the display.

BRIEF DESCRIPTION OF THE DRAWINGS

Preferred embodiments of the invention are shown in the accompanying drawings, in which.

DETAILED DESCRIPTION OF PREFERRED EMBODIMENTS

Figure 1:
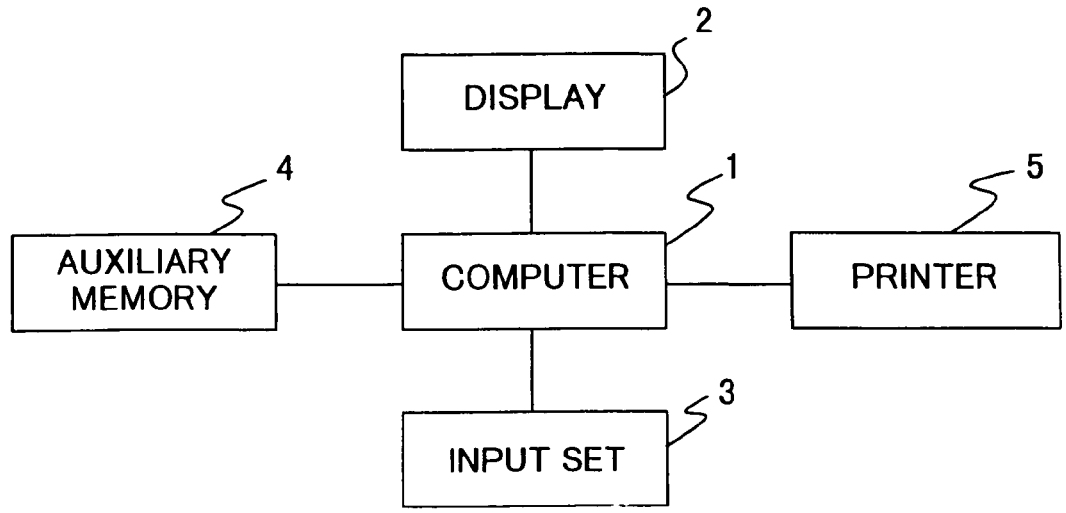
FIG. 1 is a schematic block diagram of a computer system embodying the invention.

FIG. 1 shows a computer system embodying the invention. This system can operate in accordance with software such as a printer driver to function as a printing processor for a printing process embodying the invention. The system includes a personal computer 1, a display 2, an input set 3, an auxiliary memory 4 and a laser printer 5.

The computer 1 consists basically of hardware including an operation unit or part, a controller, a main memory and interface circuits, and of software including an OS for interactive operation through a GUI. In accordance with programs such as an application and a printer driver which are read into the main memory, the computer 1 or its CPU operates to execute processes for data origination, printing, etc. The computer 1 might be any other computer of processing performance for the scale of the computer system. For example, the computer 1 might be a medium or large computer of higher performance than a personal computer.

The display 2 may be a CRT display, a liquid crystal display, a plasma display or another display for displaying the data output from the computer 1.

The input set 3 consists of a keyboard and a mouse, which is a pointing device, for entering data into the computer 1. This set 3 might instead include a tablet or another pointing device.

The auxiliary memory 4 is a magnetic disk unit, from which data can be read out into the computer 1, and into which the data output from the computer can be written. This memory 4 might be any other auxiliary memory such as an optical disk unit.

Figure 12:
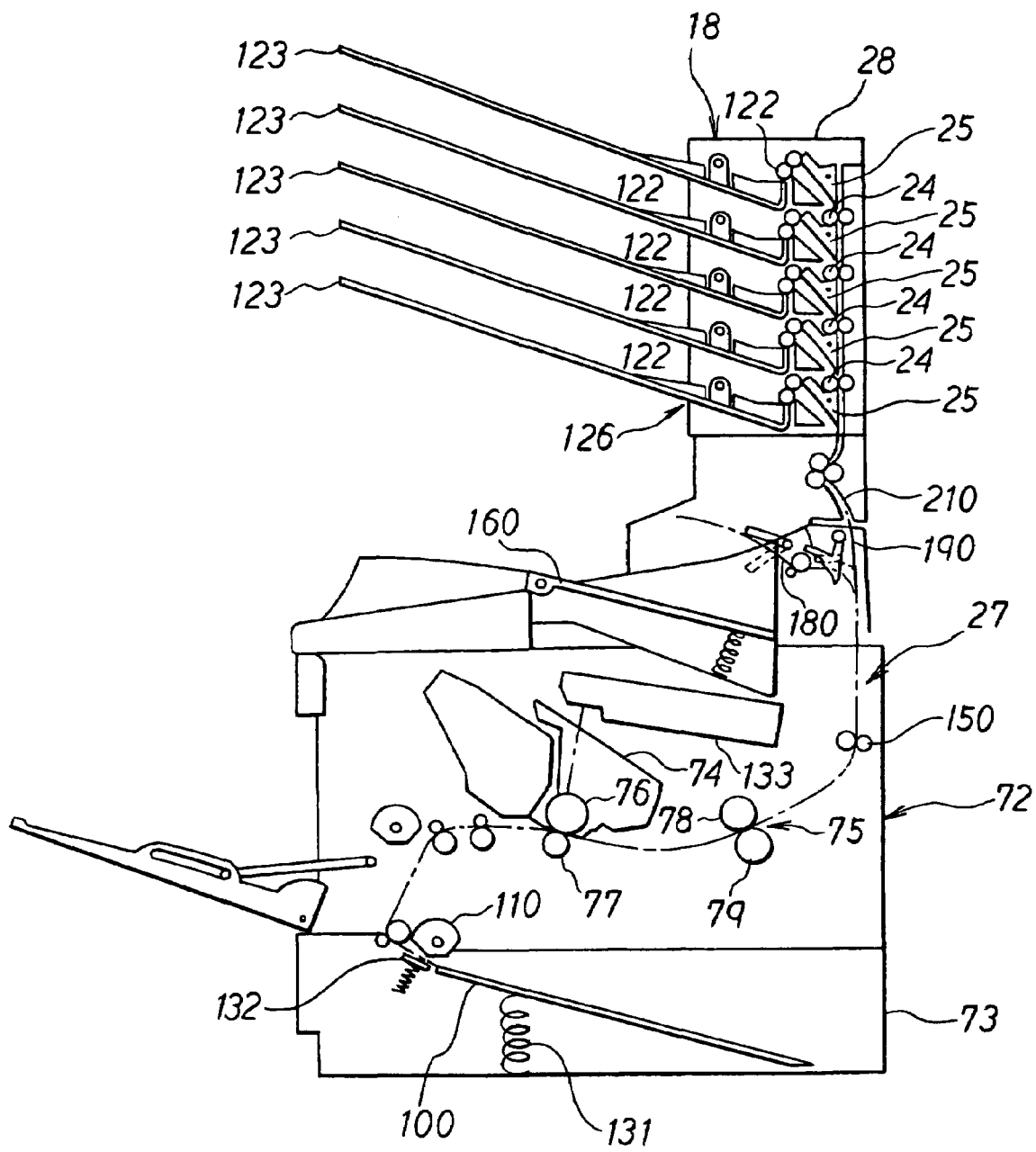
FIG. 12 shows an example of a printer with a plurality of dischargers to which the invention can be applied.

The printer 5 can print the data output from the computer 1, and be fitted with one or two optional paper dischargers (see FIG. 12). The or each discharger includes five discharge trays. The computer 1 can control or select which of the trays prints should be discharged to. The printer 5 may either be a monofunctional printer only for printing, or be a multifunctional printer for not only printing but also fax and/or copying. The printer 5 might be a printer of another recording type such as an ink jet printer and a thermal transfer printer.

The components 1–5 are connected for data communication through data transmission channels. These channels may either take the form of dedicated communication cables each connecting two of the components 1–5 directly, or be part of a network such as a LAN. The channels may either be line transmission channels such as communication cables, or partly include radio transmission channels for transmission of radio waves or infrared rays.

In a case where the components 1–5 are connected in a network, many additional components or apparatus (not shown) may generally be connected in it. Regardless of the form of connection, the computer 1 might be connected to two or more displays, input sets, auxiliary memories and/or printers. For simplification, FIG. 1 shows only the basic arrangement, and does not show optional components or parts.

Figure 2:
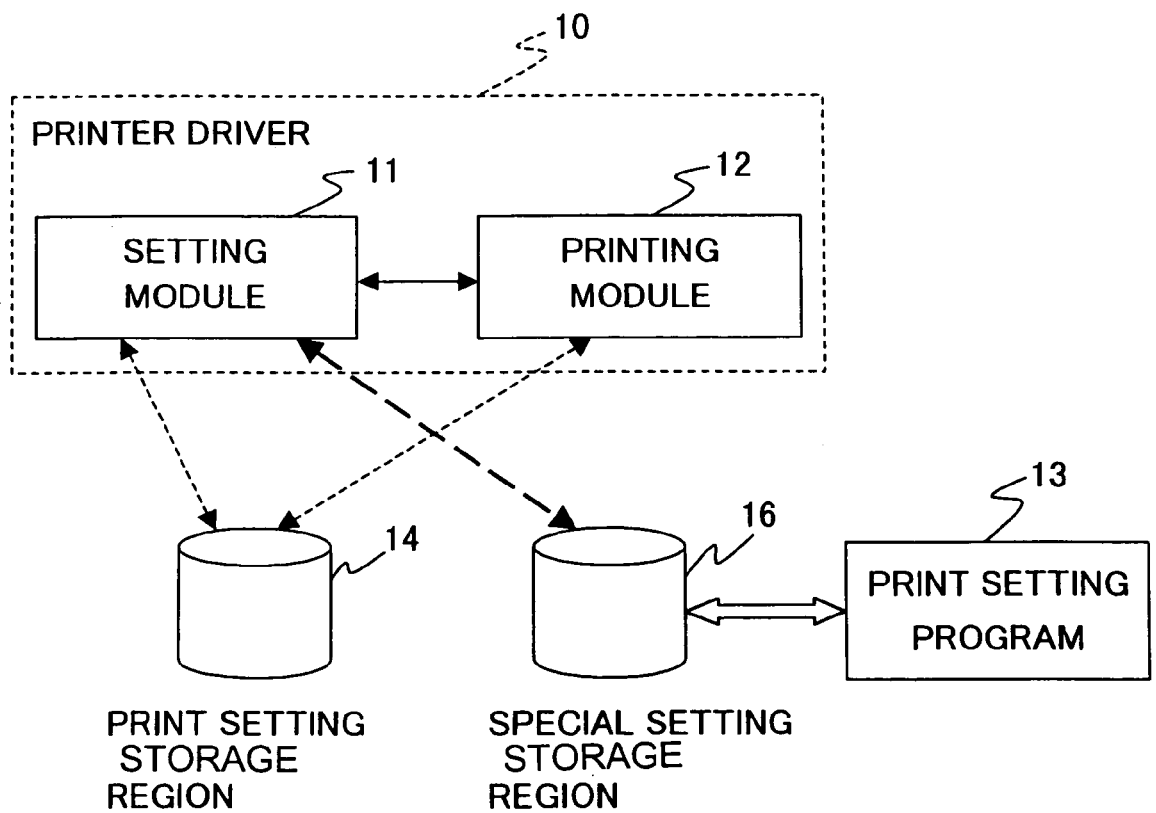
FIG. 2 is a modular block diagram of a printer driver and a print setting program for use with the computer system.

FIG. 2 shows a printer driver 10 and a print setting program 13 for the printer 5. The driver 10 and the program 13 can cause the computer 1 to execute a printing process.

The printer driver 10, as is the case with the conventional printer driver, includes a setting module 11 mainly for controlling or managing the data set for the printer 5 and a printing module 12 mainly for originating print data and control data. The modules 11 and 12 might otherwise be separate or independent programs.

The print setting program 13 runs as another process than the printer driver 10 to manage part of the data set for the printer 5.

Some of the data set for the printer 5 are stored in a print setting storage region 14, and the others are stored in a special setting storage region 16. Specifically, the print setting storage region 14 stores in it the set data which the printer driver 10 causes to be read and written. The special setting storage region 16 stores in it the set data which both the driver 10 and the print setting program 13 cause to be read and written. More specifically, the special setting storage region 16 stores in it the set values (discharge position data) representing which of the ten discharge trays prints should be discharged to.

The setting storage regions 14 and 16 may be included or provided in the auxiliary memory 4 or the nonvolatile memory (not shown) of the computer 1. Otherwise, the regions 14 and 16 may be provided in the volatile memory (not shown) of the computer 1, and the set data may be copied from the memory 4 when the system starts.

If the set data in the print setting storage region 14 include the setting for starting the print setting program 13, the printer driver 10 can cause this program to start. The started program 13 keeps present in the main memory of the computer 1 unless this program is ended in a predetermined way. It is determined in the process of the driver 10 whether to start the program 13 or not.

Figure 3:
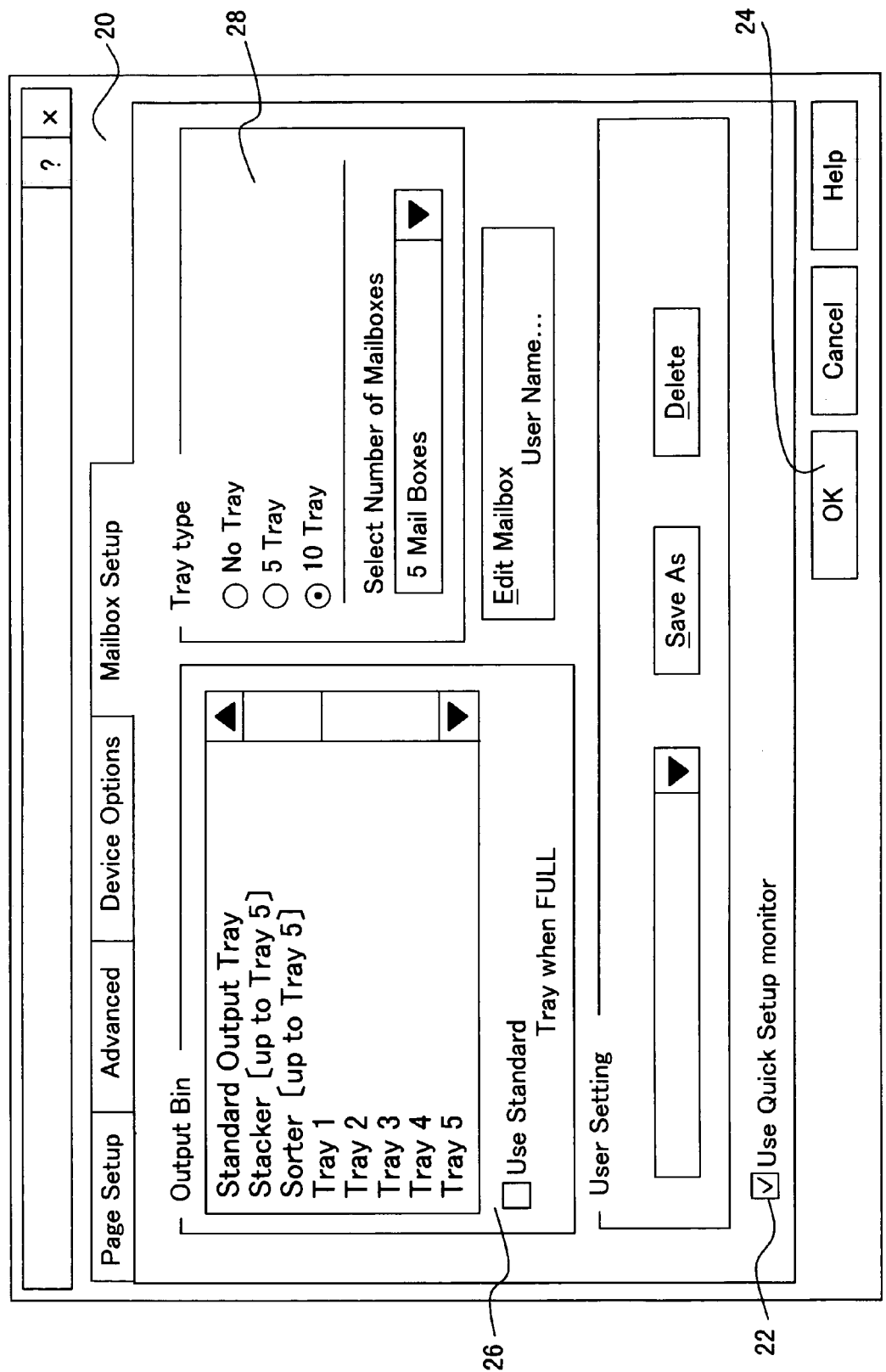
FIG. 3 is an illustration of a window displayed on the display of the computer system in accordance with the printer driver.

Specifically, if the operator does a predetermined operation, the printer driver 10 causes a window 20 as shown in FIG. 3 to be displayed on the display 2. Then, if the operator clicks with the input set 3 the box 22 entitled "Use Quick Setup monitor" on the window 20, the driver 10 causes either a check to be put in the box or the put check to be deleted. If, with the box 22 checked or ticked, the operator clicks the "OK" button 24 on the window 20, the driver 10 causes the setting for starting the print setting program 13 to be written into the print setting storage region 14. Thereafter, when the driver 10 starts operating, it causes the print setting storage region 14 to be referred to. If this region 14 has the setting for starting the program 13, this program starts.

Explanation will be made of a process for displaying and/or changing the discharge position or destination in the printer 5.

The printer 5 has a standard discharge port (not shown) in addition to the paper dischargers. Prints can be discharged selectively into either any of the ten discharge trays or the port. Either the printer driver 10 or the print setting program 13 can specify the position to which the prints should be discharged.

If two or more users share the printer 5 through a LAN or another network, it is important information for each of them which of the discharge trays holds his or her prints, because he or she needs to take out the prints from the appropriate tray. Particularly, in a case where the trays are selectable, this information enables each user to take out his or her prints in a short time in distinction from the other user's or users' prints. It is preferable that the information be displayed together with a picture of the trays on the display 2 so that the information may visually appeal more easily and may be more effective.

Figure 4:
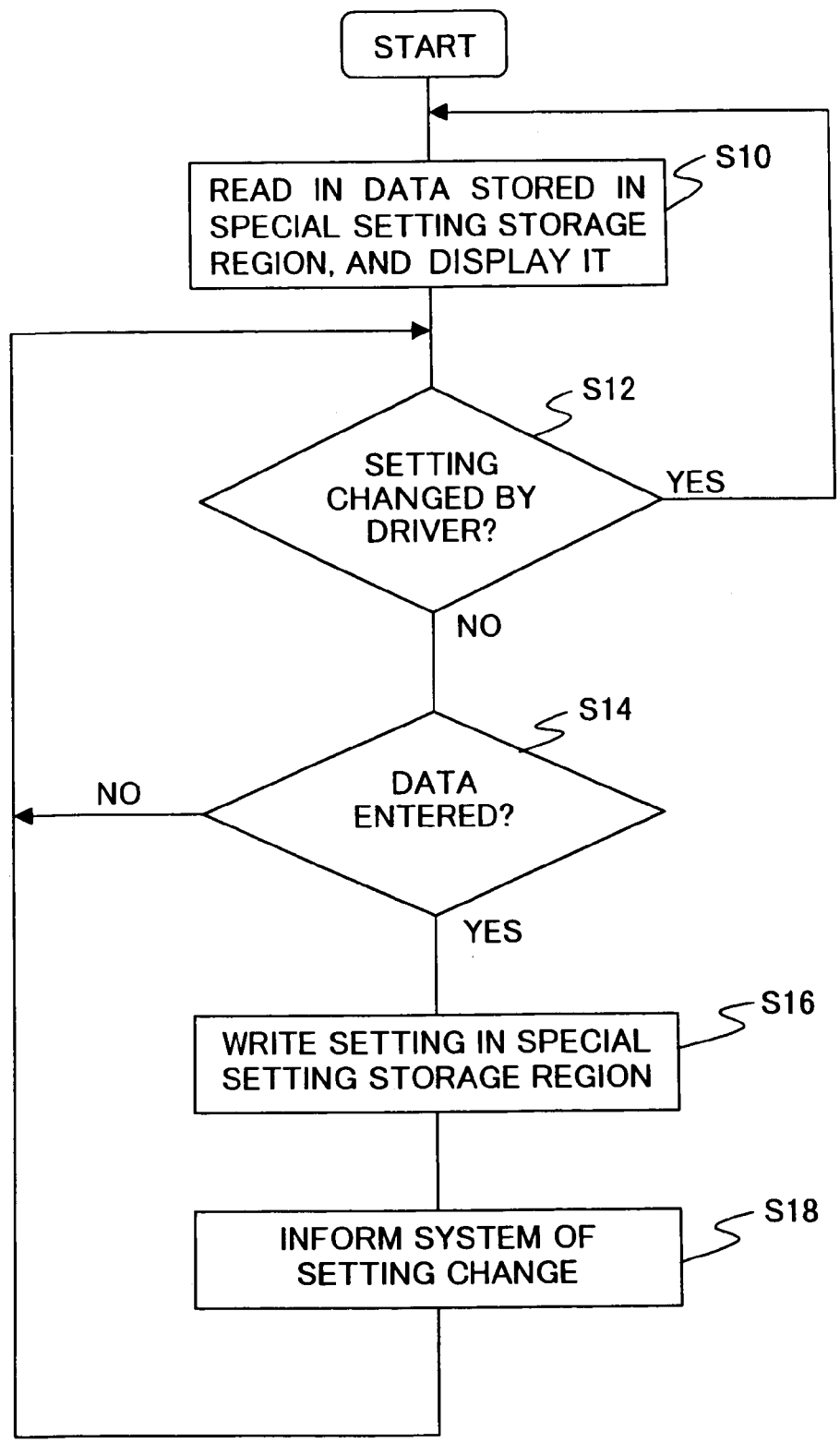
FIG. 4 is a flowchart of the print setting program.

FIG. 4 shows the discharge position displaying/changing process ("displaying step") in accordance with the print setting program 13.

Figure 5:
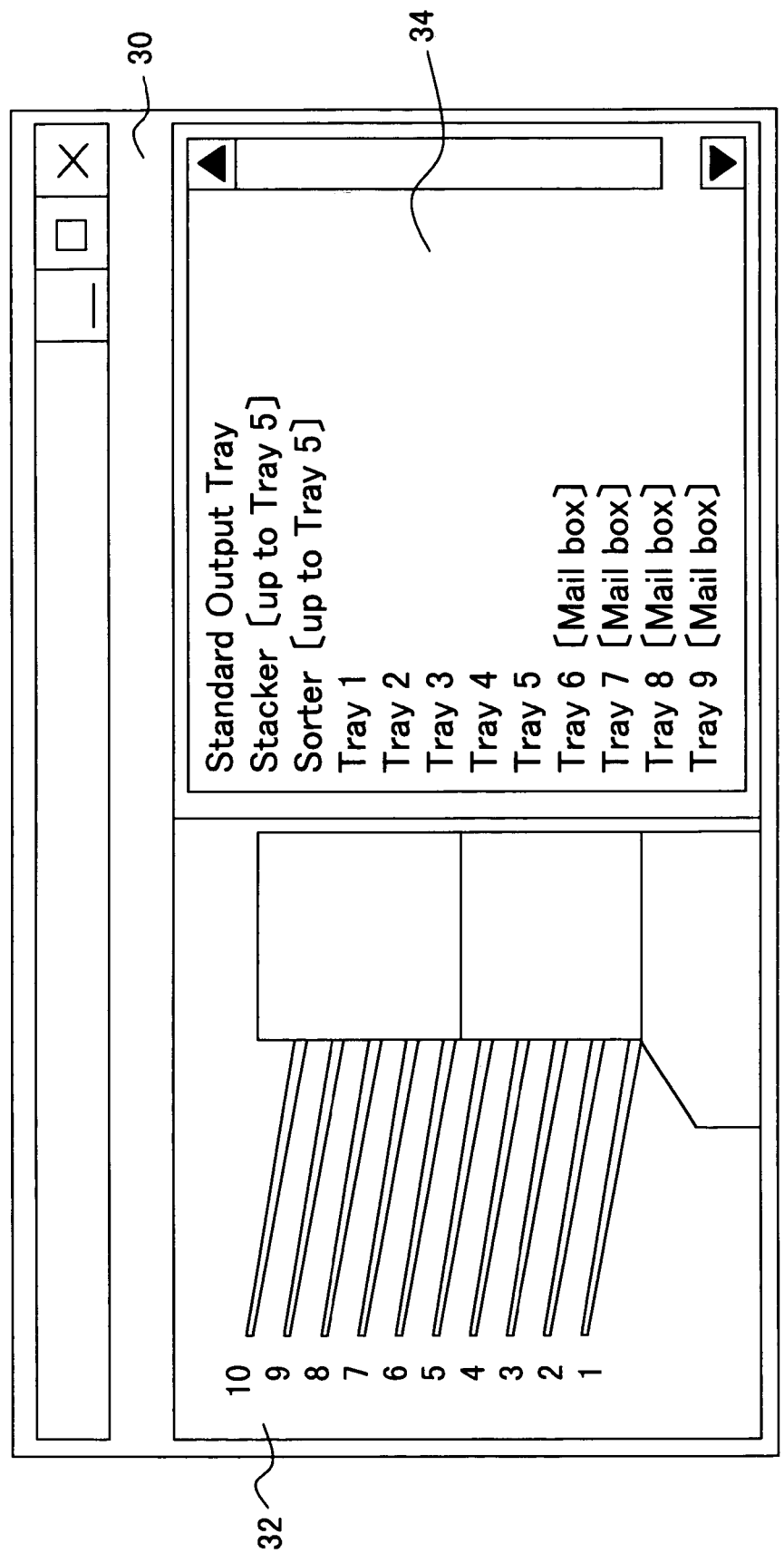
FIG. 5 is an illustration of a window displayed on the display in accordance with the print setting program.

When the discharge position displaying/changing process starts, the print setting program 13 causes the discharge position data stored in the special setting storage region 16 to be read in, and a window 30 as shown in FIG. 5 to be displayed on the display 2 (S10). The window 30 shows the currently set discharge position. The window 30 includes a picture space 32 showing a picture of the discharge trays and a legend space 34 showing legends for them. In the spaces 32 and 34, the discharge position is indicated by coloration, reversal or the like, which is not shown in FIG. 5.

Next, it is judged or determined whether the printer driver 10 has caused the discharge position data in the special setting storage region 16 to be updated (S12). This judgment is necessary because the driver 10 may make this data updated while it is operating in parallel. The judgment depends on whether the print setting program 13 has been informed or notified at the step S38 in FIG. 6. If the program 13 has been informed, it is judged that the driver 10 has made the discharge position data updated. Then, the discharge position displaying/changing process returns to the step S10, where the indication of the discharge position will be updated. If the driver 10 has not made the discharge position data updated, it is judged whether a data has been entered with the input set 3 (S14).

If a data is entered at the step S14, the discharge position data is updated. Specifically, in accordance with the position of the cursor (or the item indicated by reversal) at the time when the data is entered, the discharge position selected by the operator is identified. The discharge position data representing the identified position is written into the special setting storage region 16 (S16). Then, the system is informed that the discharge position has been changed (S18). That is to say, by the print setting program 13 making this updating process executed, part of the set data is updated directly without the printer driver 10 intervening. If no data is entered at the step S14, the discharge position displaying/changing process returns to the step S12. Thereafter, unless the set data is updated in accordance with the driver 10, or with an entered data, the displaying/changing process stands by or waits, repeating the steps S12 and S14.

Figure 6A:
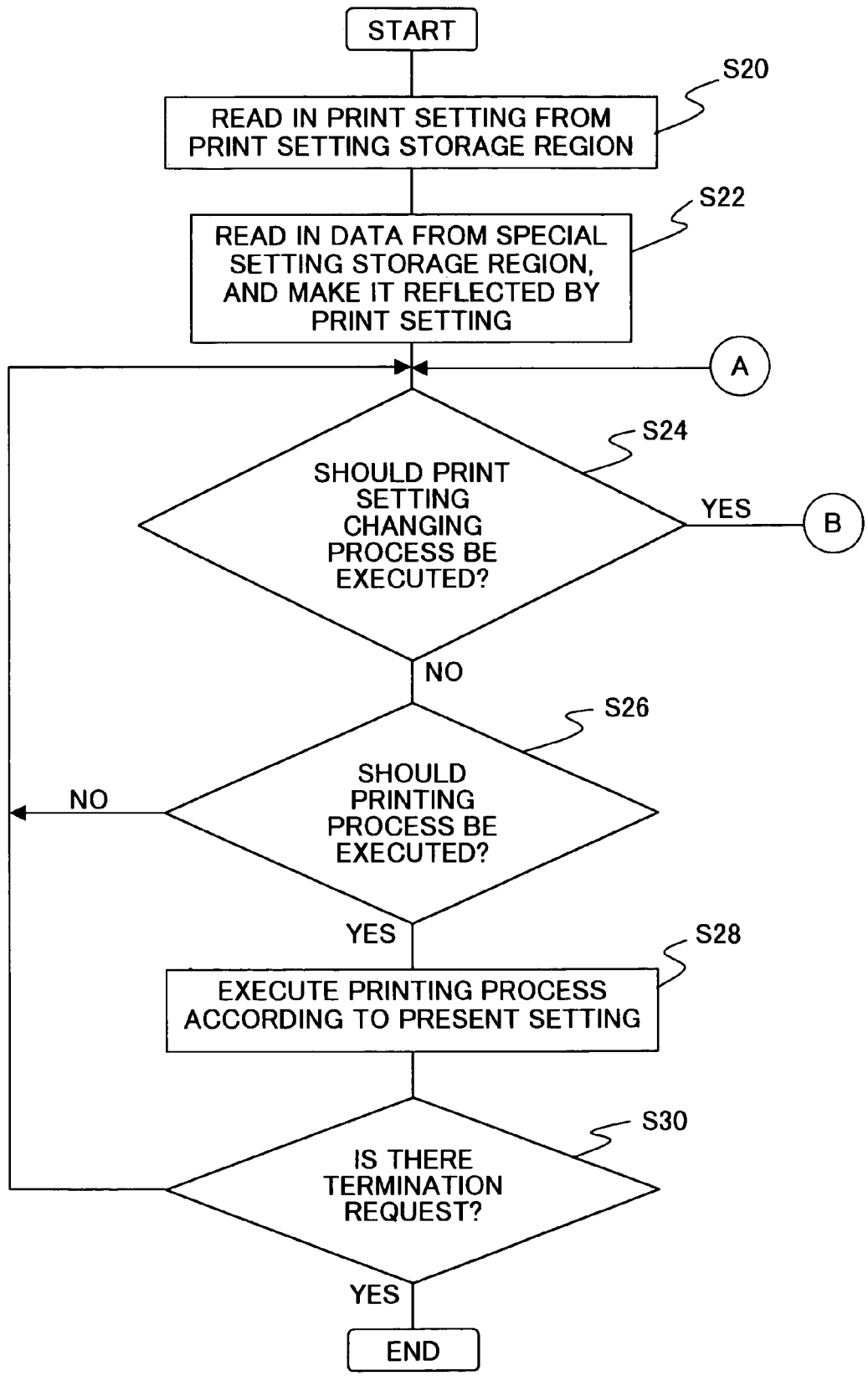
FIGS. 6A and 6B are a flowchart of the printer driver.
Figure 6B:
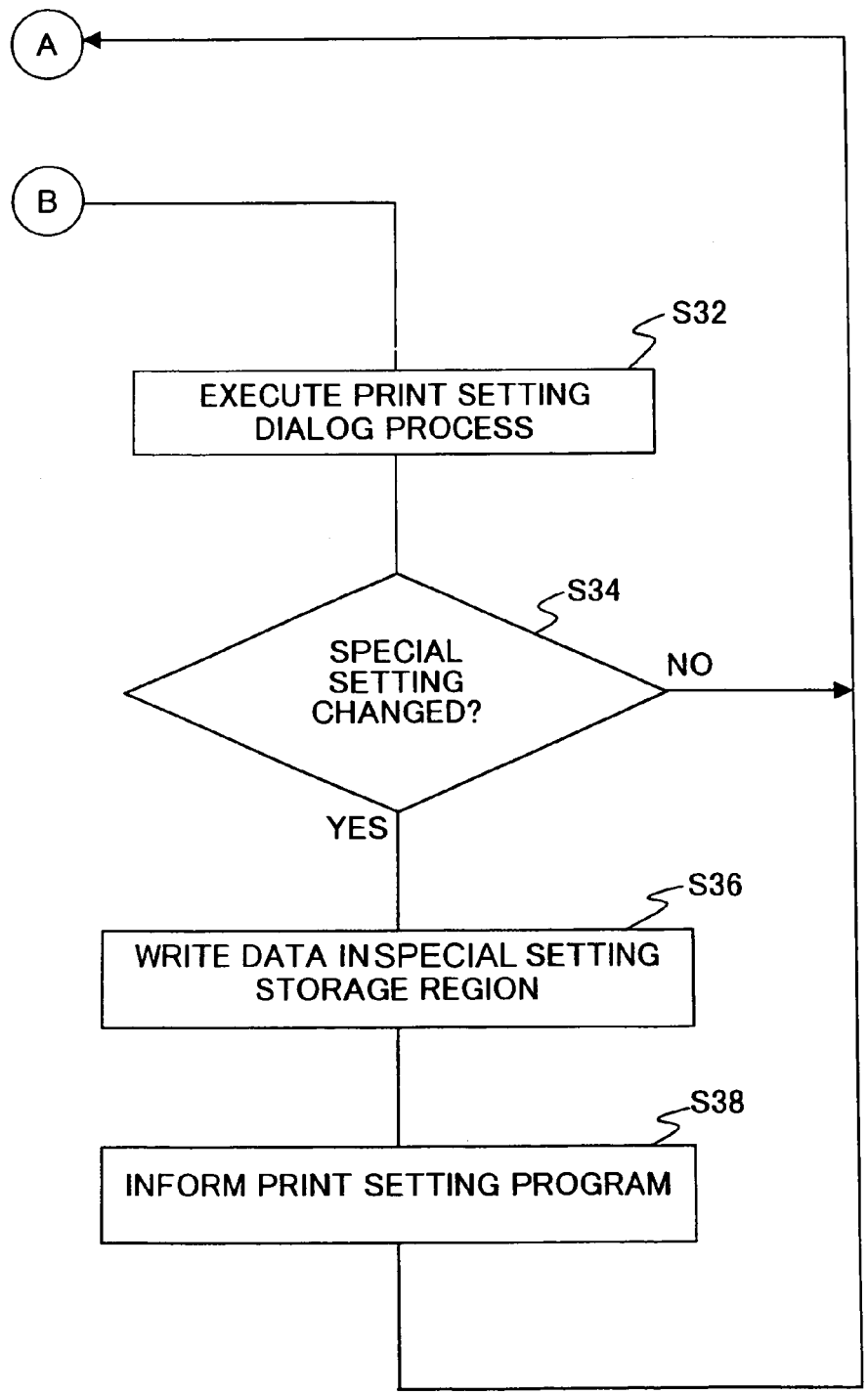

FIG. 6 shows the setting changing process in accordance with the printer driver 10. The discharge position can be changed during this process. Such a discharge position changing function itself can be activated by a conventional printer driver of this type. However, because the system embodying the invention executes the discharge position displaying/changing process in accordance with the print setting program 13, its specific procedure for changing the discharge position includes steps not included in the conventional driver.

When the setting changing process starts, the printer driver 10 causes the set data to be read in from the print setting storage region 14 (S20). Then, the driver 10 also causes the discharge position data to be read in from the special setting storage region 16 and reflected by the presently set data (S22).

Next, it is judged whether a print setting changing process should be executed (S24). If this process should not be executed, it is judged whether a printing process should be executed (S26). If the printing process should, as is often or normally the case, be executed, it is executed in accordance with the present settings (S28). Then, it is judged whether there is a request for termination from the host process (application or system process) which has accessed or called the printer driver 10 (S30). If there is, the process according to the driver 10 ends. If it is judged at the step S26 that no printing process should be executed, or if it is judged at the step S30 that there is no termination request, the process according to the driver 10 returns to the step S24.

If it is judged at the step S24 that a print setting changing process should be executed, a print setting dialog process is executed (S32). As is the case with the conventional printer driver, the dialog process involves displaying various windows (dialog boxes) on the display 2 in accordance with entering operations. One of these windows is the window 20 of FIG. 3.

The window 20 includes a box 26 for a user to select one of the discharge positions. The window 20 includes another box 28 for the user to select the number of discharge trays. Specifically, the user can select no, five or ten trays. If the number of discharge trays is changed in the box 28, the discharge positions selectable in the box 26 are changed accordingly. When the user selects one of the discharge positions and clicks the "OK" button 24 on the window 20, the step S32 ends.

Next, it is judged whether the special settings have been changed (S34). The special settings include the discharge position setting and the number of discharge trays, and depend on how many dischargers are mounted on the printer 5.

If the discharge position has not been changed (no at S34), the process according to the printer driver 10 returns to the step S24. If the discharge position has been changed, the data for the changed position is written into the special setting storage region 16 (S36). In the meantime, the print setting program 13 is informed that the discharge position data has been updated (S38). Then, the process returns to the step S24.

When the print setting program 13 is informed at the step S38 that the discharge position data has been updated, it is judged at the step S12 (FIG. 4) of this program that the printer driver 10 has made the discharge position data updated. Then, the program 13 makes the displayed discharge position updated.

If another set data than the discharge position data has been changed, or if another operation has been carried out, another process (not shown) may branch from the setting changing process according to the printer driver 10. Such another process is not related directly to the main part of the invention, and will therefore not be explained.

Thus, when the printer driver 10 starts, the print setting program 13 can be started. Therefore, the program 13 makes the computer 1 execute the process ("displaying step") for displaying the discharge position data (that is, at least part of the set data) on the display 2, before the driver 10 makes the computer execute the process for originating print data necessary for printing by the printer 5 and/or the process for originating control data necessary for controlling the printer on the basis of the set data stored in the print setting storage region 14 and the special setting storage region 16. This makes it possible to always check or confirm the discharge position on the display 2 before printing. Consequently, there is no need for a complex operation like the conventional operation for checking the discharge position.

It can be determined by the process of the printer driver 10 whether to start the print setting program 13. It is therefore easy for a user who need not check the discharge position to stop the display according to the program 13.

The print setting program 13 can function to update the discharge position data. Therefore, after checking the discharge position on the display according to the program 13, it is possible to change the position immediately without spending time to access the printer driver 10. This improves the system operability.

In FIG. 12, an embodiment of a laser printer provided with a paper sheet discharge apparatus, to which the present invention can be applied, is shown.

With reference to FIG. 12, a paper sheet cassette 73 for accommodating paper sheets as recording media in a stacked state is provided under the laser printer 72. The paper sheet cassette 73 is provided with a receiving plate 100 for receiving the paper sheets in the stacked manner and a spring 131 for urging the receiving plate 100 upwardly. A transport roller 110 and a friction separator pad 132, which are used to separate and feed, one by one, the paper sheets stacked on the receiving plate 100, are provided in the vicinity of one end of the receiving plate 100. The paper sheets, which are stacked in the cassette 73, are transported toward an image-forming unit 74.

The image-forming unit 74 is arranged downstream of the paper sheet cassette 73 in the transport direction of the paper sheet. The image-forming unit 74 is provided in order that an electrostatic latent image, which is formed by exposing a photosensitive member-equipped drum after charging, with the light in accordance with image information by using a laser scanner 133, is developed with toner to form a toner image. A fixing unit 75 for fixing the toner transferred to the paper sheet is arranged downstream of the image-forming unit 74. The image-forming unit 74 comprises the photosensitive member-equipped drum 76, an unillustrated developing unit, an unillustrated charging unit, and other components. After charging the photosensitive member-equipped drum 76, the electrostatic latent image, which is formed by exposure and scanning with the laser scanner 133, is developed with the toner to form the toner image. A transfer roller 77 for transferring the toner image formed on the photosensitive member-equipped drum 76 onto the paper sheet is provided under the photosensitive member-equipped drum 76. On the other hand, the fixing unit 75 comprises a heating roller 78 and a pressing roller 79 which is arranged in opposition to the heating roller 78. The paper sheet, which is transported from the cassette 73, is fed to the space between the photosensitive member-equipped drum 76 and the transfer roller 77 of the image-forming unit 74 to transfer the toner image thereon. After that, the paper sheet is fed to the space between the heating roller 78 and the pressing roller 79 of the fixing unit 75 to fix the transferred toner image. The paper sheet is then fed to the discharge rollers 150.

A discharge unit 27 for discharging the paper sheets is provided downstream of the fixing unit 75 in the paper sheet transport direction. The discharge unit 27 comprises discharge rollers 150, a discharge tray-side guide passage 180 for discharging the paper sheets discharged from the discharge rollers 150 toward a discharge tray 160, and an introducing passage-side guide passage 190 for discharging the paper sheets toward an introducing section of the paper sheet discharge apparatus 18.

The paper sheet discharge apparatus 18 is detachably attached to the upper portion of the laser printer 72. The paper sheet discharge apparatus 18 comprises, in its casing 126, an introducing passage 210 for receiving the paper sheet on which a predetermined image is formed by the image-forming apparatus 72, a plurality of delivery rollers 122 for discharging the paper sheet, a plurality of bins 123 provided corresponding to the respective delivery rollers 122, for storing the paper sheets discharged from the respective delivery rollers 122, transport rollers 124 for transporting the paper sheet received from the introducing passage 210 to the respective delivery rollers 122, and a plurality of switching flappers 25 for switching the transport direction in order to transport the paper sheet received from the introducing passage 210 to the specified delivery rollers 122. The paper sheet having an image fixed thereon is fed by the discharging unit 27 into the guide passage 190. The sheet is directed to the desired bin 123 by the switching operation of the switching flapper 25 which has been operated by a control unit such as computer 1 as shown in FIG. 1. As mentioned before, the operator can check the desired bin (discharger) on the display and, if necessary, change the bin 123 to another bin 123 in accordance with the printer driver program described above.

The invention is not limited to the foregoing embodiment, but various modifications may be made, and useful modifications will be described below.

Figure 7:
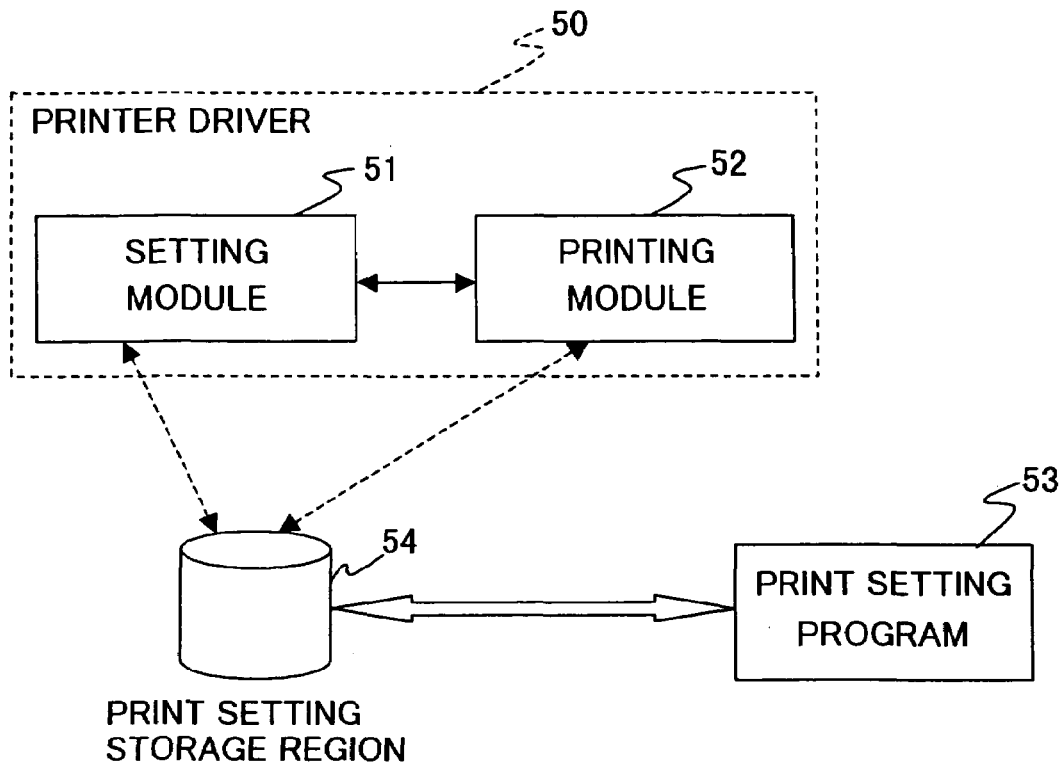
FIG. 7 is a modular block diagram of another printer driver and another print setting program for the computer system.
Figure 8:
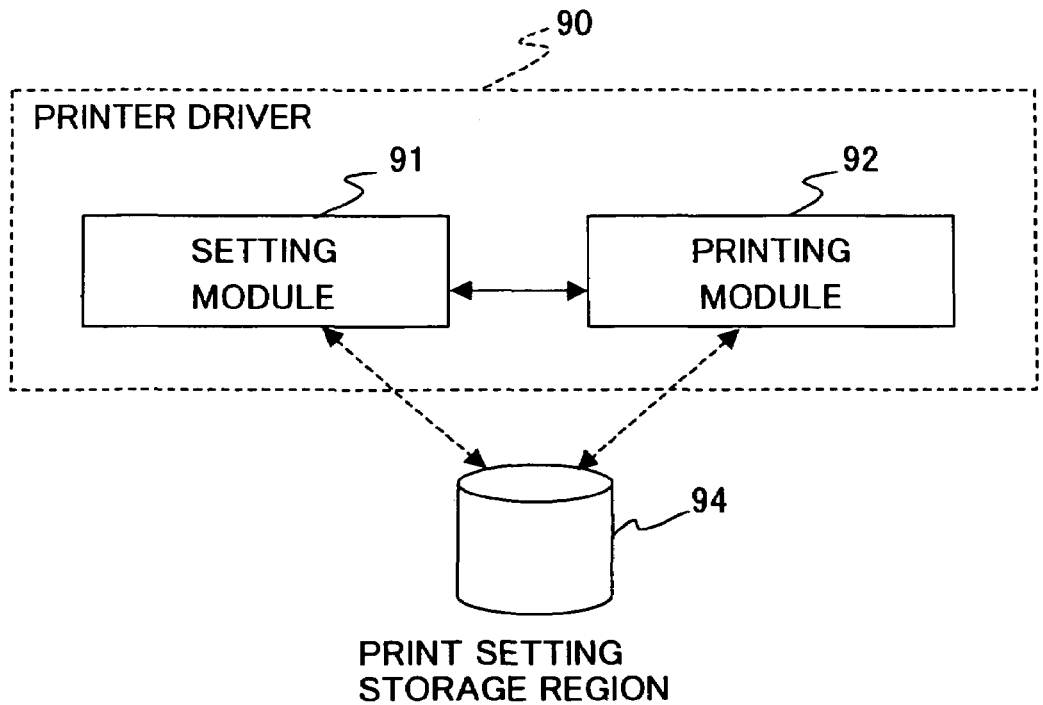
FIG. 8 is a modular block diagram of a conventional printer driver.
Figure 9:
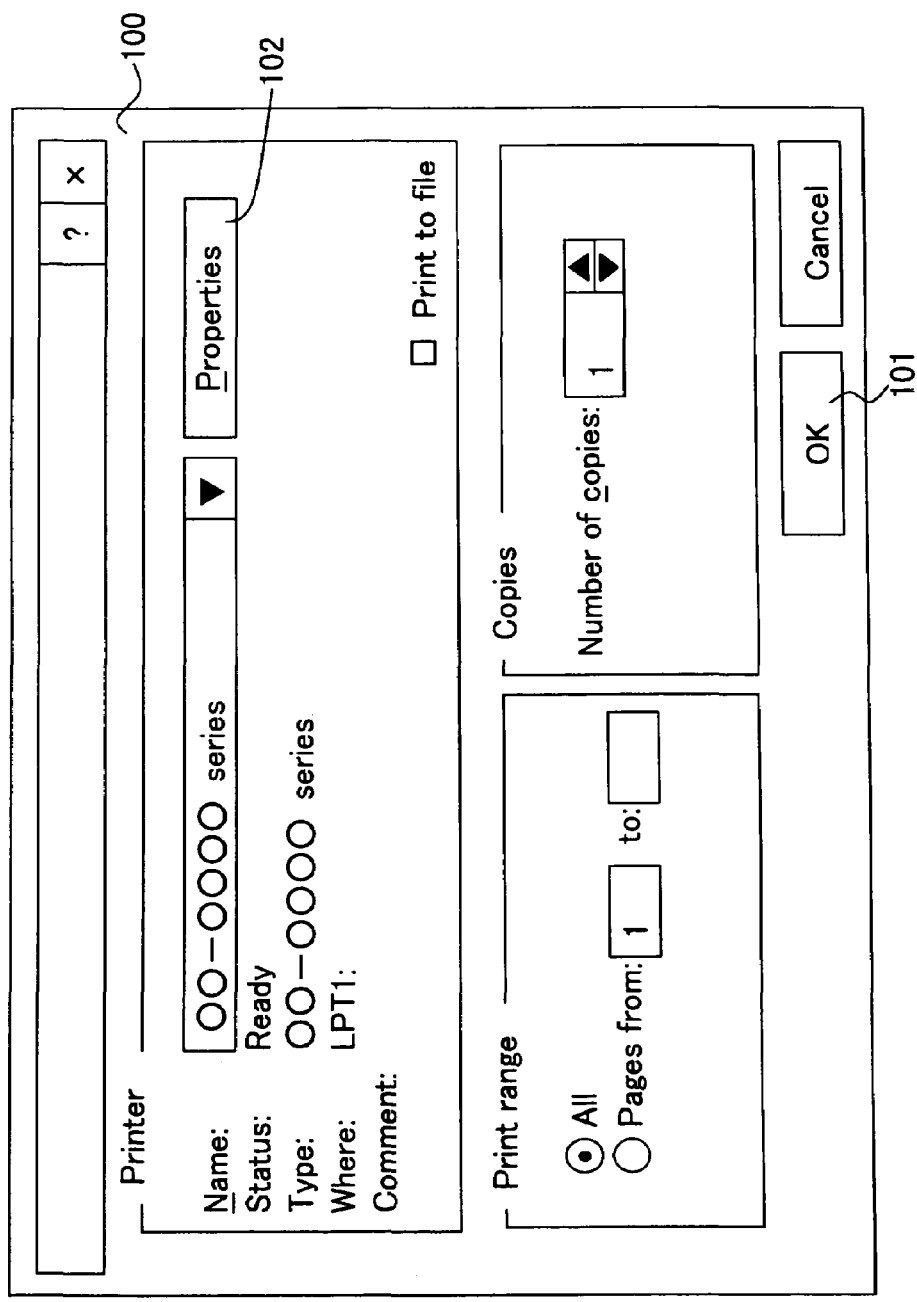
FIG. 9 is an illustration of a window displayed in accordance with the conventional printer driver.
Figure 10:
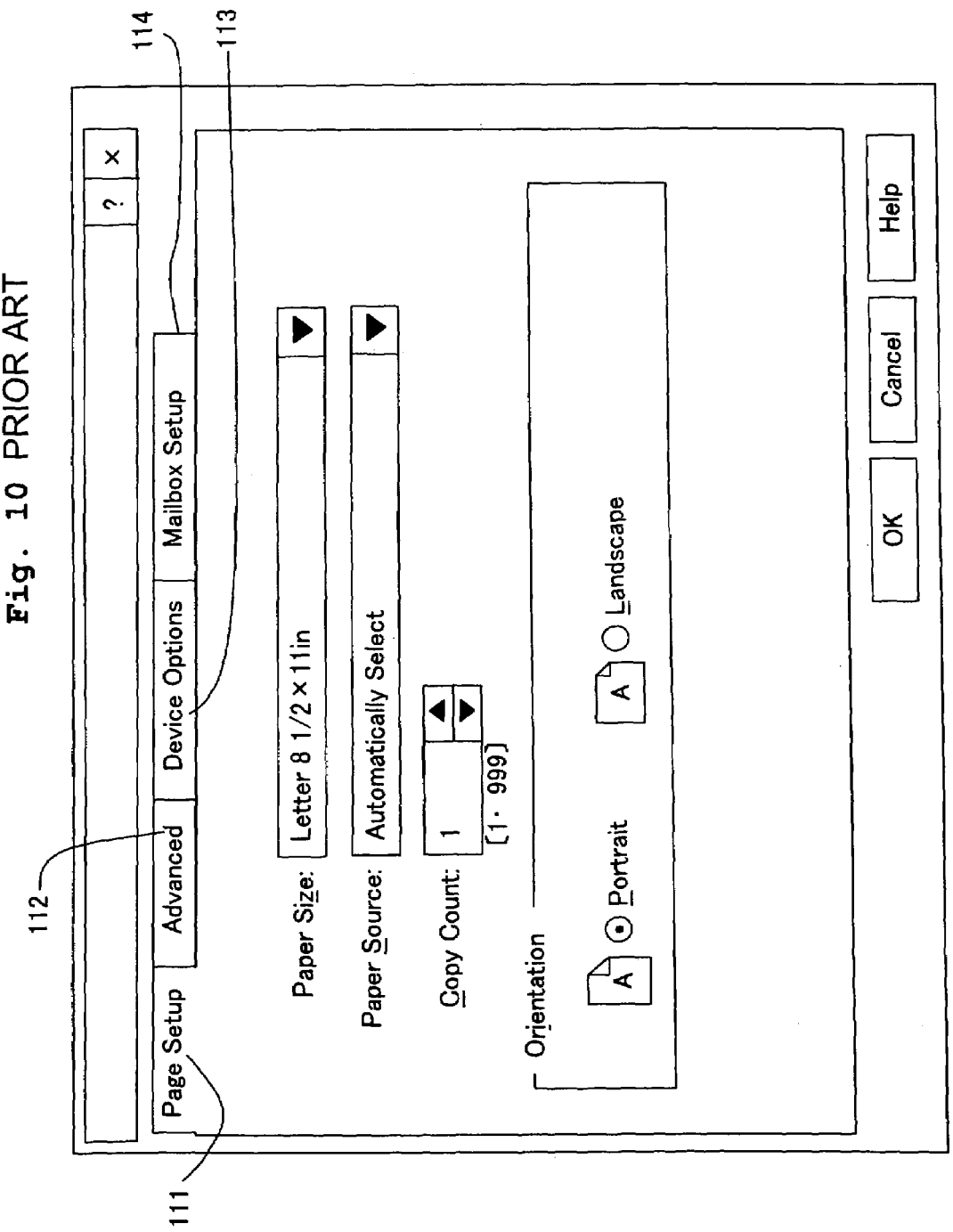
FIG. 10 is an illustration of another window displayed in accordance with the conventional printer driver.
Figure 11:
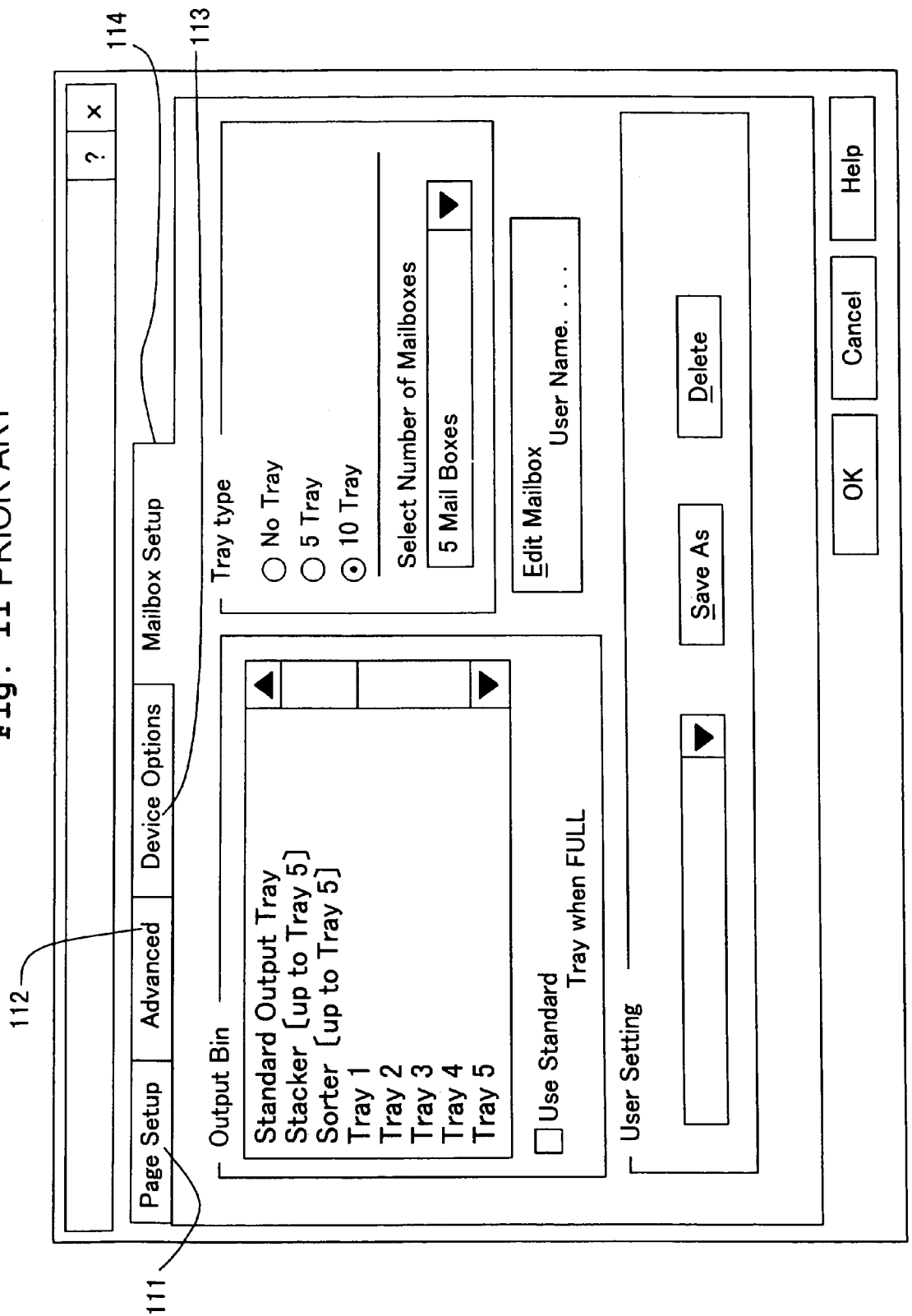
FIG. 11 is an illustration of still another window displayed in accordance with the conventional printer driver.

Both the print setting storage region 14 and the special setting storage region 16 of the embodiment are provided, and the print setting program 13 can cause data to be read from and written into only the region 16. By contrast, FIG. 7 shows another printer driver 50 and another print setting program 53, both of which can cause data to be read out from and written into a print setting storage region 54. In this case, the driver 50 need not be adapted for a special setting storage region. The print setting storage region 54 may be of a type dependent on the driver 50. In such a case, if the program 53 is adapted for some types of printer drivers, it needs to enable data to be read out from and written into different types of print setting storage regions. This makes the program 53 liable to be large. It is therefore expected that the provision of a special setting storage region 16 will make smaller the memory which is necessary if one of the drivers and the program 53 operate at the same time.

The printer driver 10 may be replaced with two or more printer drivers adapted for the same output destination in the system, as far as they are adapted for at least the printer 5. In this case, if a print setting storage region and a special setting storage region are provided for each of the printer drivers, it is possible to change the content of the set data for each printer driver. If one of the printer drivers is selected, the prints are discharged to one of the discharge trays of the printer 5.

Part of each print setting storage region or each special setting storage region may be provided as a common region for all of the printer drivers. Other part of each print setting storage region or each special setting storage region may be provided as an individual region for one of the printer drivers. In this case, for example, as to how many discharge trays are mounted on the printer 5, the same data should be set for all of the printer drivers. Therefore, set data of this type are stored in the common regions for the printer drivers. On the other hand, as to which discharge tray each print should be discharged to, different data may be set for the printer drivers. Therefore, set data of this type are stored in the individual regions for the printer drivers. If a common part of the set data is changed in accordance with one of the printer drivers, this part of the data is changed for all of the drivers. This makes it easy to keep the set data matched or conformed.

What is claimed is:

1. A method of setting a printer setting, comprising steps of:

storing a set data for a printer in a print setting storage region;

displaying a first window which indicates the set data upon an instruction by a user to display the first window, the set data being confirmable or changeable by the user on the first window;

activating a second window upon an instruction by the user via a selection in the first window;

storing a special set data for the printer in a special setting storage region;

displaying the second window, after activation, when a printer driver starts operating, the second window being different from the first window and which indicates the special set data, the special set data being confirmable or changeable by the user on the second window; and instructing the printer to start printing, via a window that is different from the second window, based on an instruction by the user after the special set data has been confirmed or changed by the user in the second window, wherein the second window is displayed independently of displaying the first window without any instruction by the user in the first window once the second window has been activated upon the instruction by the user via the selection in the first window.

2. The method according to claim 1, wherein the special set data is identical to a part of the set data.

3. The method according to claim 1, wherein the printer has a plurality of discharge portions, in each of which a sheet is discharged, and the special set data includes a designated discharge position which is displayed in the second window.

4. The method according to claim 3, wherein the displaying step of the second window involves changing the designated discharge position into another discharge position and updating the changed discharge position in the special setting storage region.

5. A computer-readable medium in which a computer-executable program is stored, the program controlling a computer to set a printer setting with the steps of:

storing a set data for a printer in a print setting storage region;

displaying a first window which indicates the set data upon an instruction by a user to display the first window, the set data being confirmable or changeable by the user on the first window;

activating a second window upon an instruction by a user via a selection in the first window;

storing a special set data for the printer in a special setting storage region;

displaying the second window, after activation, when a printer driver starts operating, the second window being different from the first window and which indicates the special set data, the special set data being confirmable or changeable by the user on the second window; and instructing the printer to start printing, via a window that is different from the second window, based on an instruction by the user after the special set data has been confirmed or changed by the user in the second window, wherein the second window is displayed independently of displaying the first window without any instruction by the user in the first window once the second window has been activated upon the instruction by the user via the selection in the first window.

6. A printing processor for a printer with a printer driver, comprising:

a memory containing stored set data;

a display for displaying a first window which indicates the set data upon an instruction by a user to display the first window so that the user can confirm or change the set data on the first window, the first window containing a selection that enables a user to activate a second window for display, the second window being different from the first window and which indicates a special set data so that the user can confirm or change the special set data on the second window; and a control means for controlling the display to display the second window when the second window has been activated and the printer driver starts operating, and controlling the printer to start printing based on an instruction by the user in a window that is different from the second window, after the special set data has been confirmed or changed by the user in the second window, wherein the second window is displayed independently of displaying the first window without any instruction by the user in the first window once the second window has been activated upon the instruction by the user via the selection in the first window.

7. The printing processor according to claim 6, further comprising a setting means for setting when to display the second window.

8. The printing processor according to claim 6, wherein the memory includes a plurality of storage regions.

9. The printing processor according to claim 6, wherein the printer has a plurality of dischargers and the second window shows the plurality of dischargers.

* * * * *